United States Patent
Burriesci et al.

(10) Patent No.: US 11,553,033 B2
(45) Date of Patent: Jan. 10, 2023

(54) ADAPTIVE USER INTERFACE WITH REDUCED PAYLOAD

(71) Applicant: Google LLC, Mountain View, CA (US)

(72) Inventors: Matthew Burriesci, Mountain View, CA (US); Matthew Frisbie, Mountain View, CA (US); Eric Zhu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 925 days.

(21) Appl. No.: 16/322,483

(22) PCT Filed: Nov. 4, 2016

(86) PCT No.: PCT/US2016/060700
§ 371 (c)(1),
(2) Date: Jan. 31, 2019

(87) PCT Pub. No.: WO2018/084860
PCT Pub. Date: May 11, 2018

(65) Prior Publication Data
US 2021/0377333 A1 Dec. 2, 2021

(51) Int. Cl.
*H04L 12/00* (2006.01)
*H04L 67/06* (2022.01)
(Continued)

(52) U.S. Cl.
CPC .......... *H04L 67/06* (2013.01); *G06F 3/04842* (2013.01); *G06F 9/451* (2018.02); *G06F 16/182* (2019.01)

(58) Field of Classification Search
CPC ..... H04L 67/06; G06F 3/04842; G06F 9/451; G06F 16/182
(Continued)

(56) References Cited

U.S. PATENT DOCUMENTS

2014/0136313 A1* 5/2014 Shaw ................. G06Q 30/0246
705/14.41
2014/0365907 A1* 12/2014 De Freitas ................ G06F 8/38
715/746
(Continued)

FOREIGN PATENT DOCUMENTS

| EP | 2 271 057 A1 | 1/2011 | |
| WO | WO-2006/091154 A2 | 8/2006 | |
| WO | WO-2018085589 A1 * | 5/2018 | ........... G06F 3/0483 |

OTHER PUBLICATIONS

"Browser Sniffing", Wikipedia, Sep. 12, 2016 (3 pages).
(Continued)

*Primary Examiner* — Frantz Coby
(74) *Attorney, Agent, or Firm* — Marshall, Gerstein & Borun LLP

(57) ABSTRACT

Systems, methods, and computer-readable storage media that may be used to provide an adaptive user interface with a reduced data transmission payload are provided. One method includes identifying a plurality of data files available for transmission to a client device, each of the plurality of data files transmitted as a set of data packets having a payload comprising an amount of data, each of the plurality of data files having different payloads and causing the client device to display a respective user interface component within a user interface on the client device. The method further includes determining a property of the client device and/or a user associated with the client device and selecting a data file from among the plurality of data files in response to the property. The method further includes causing the selected data file to be transmitted to the client device.

18 Claims, 6 Drawing Sheets

(51) Int. Cl.
   *G06F 9/451* (2018.01)
   *G06F 16/182* (2019.01)
   *G06F 3/04842* (2022.01)
(58) Field of Classification Search
   USPC .......................................... 709/217, 223–226
   See application file for complete search history.

(56) References Cited

U.S. PATENT DOCUMENTS

| | | | |
|---|---|---|---|
| 2014/0372947 A1 | 12/2014 | Hill | |
| 2016/0103927 A1* | 4/2016 | Garris | G06F 16/9577 715/238 |
| 2020/0004416 A1* | 1/2020 | Marsden | G06F 3/0488 |
| 2021/0182883 A1* | 6/2021 | Harkness | G06Q 30/02 |

OTHER PUBLICATIONS

Examination Report for EP Appln. Ser. No. 16808846.6 dated Mar. 4, 2020 (5 pages).
International Preliminary Report on Patentability, Ch. I, for PCT Appln. Ser. No. PCT/US2016/060700 dated May 16, 2019 (13 pages).
International Preliminary Report on Patentability, Ch. I, for PCT Appln. Ser. No. PCT/US2017/059791 dated May 16, 2019 (3 pages).
International Search Report and Written Opinion for PCT Application No. PCT/US2016/060700 dated Jun. 12, 2017 (20 pages).
International Search Report and Written Opinion for PCT Appln. Ser. No. PCT/US2017/059791 dated Jan. 23, 2018 (19 pages).
First Office Action for CN Appln. Ser. No. 201680088660.7 dated Jan. 6, 2021 (13 pages).

* cited by examiner

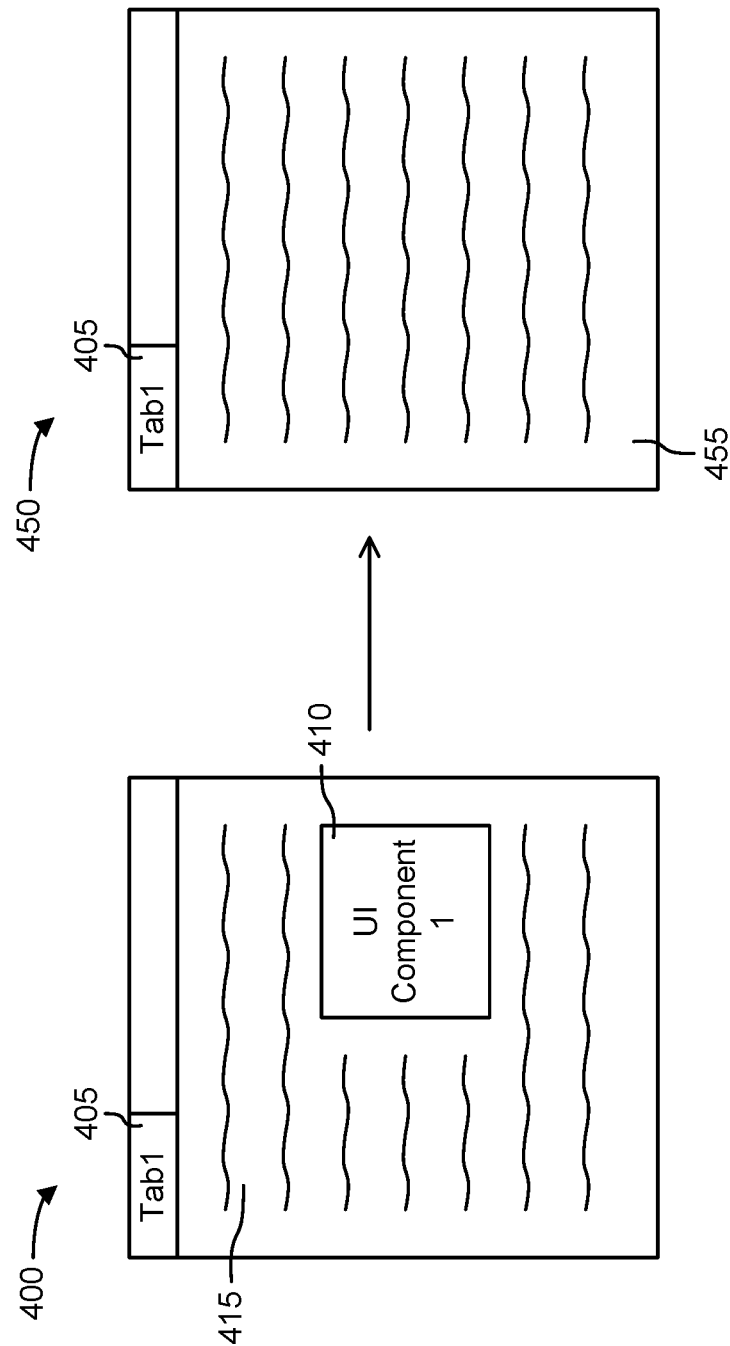

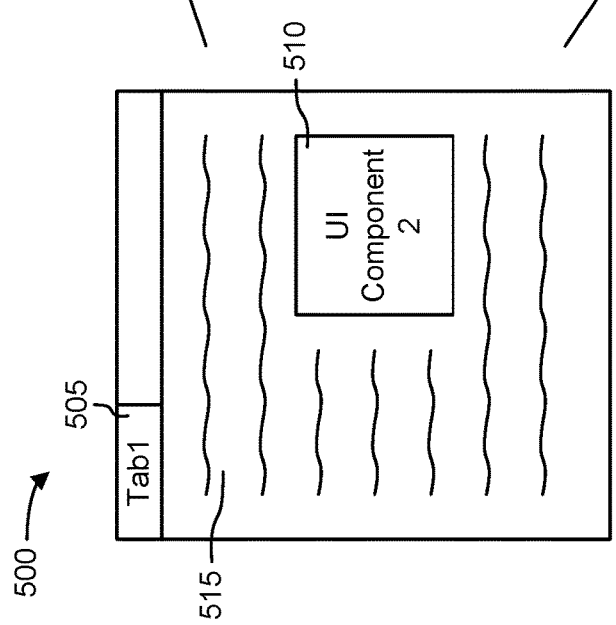
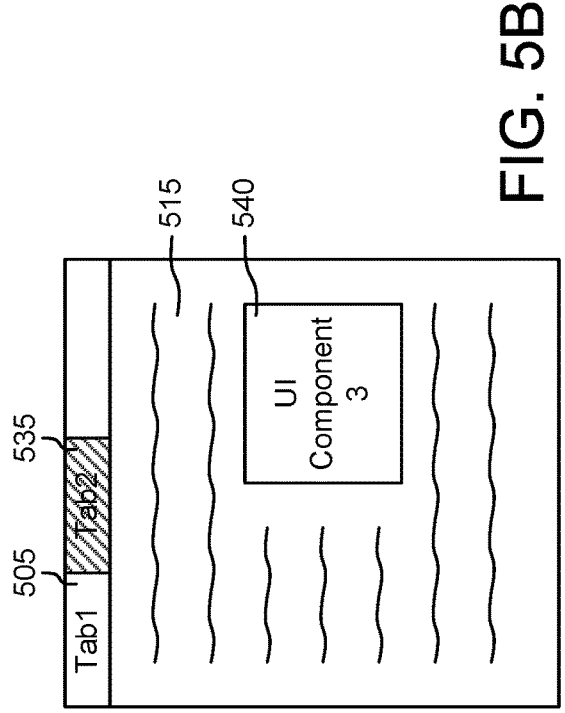
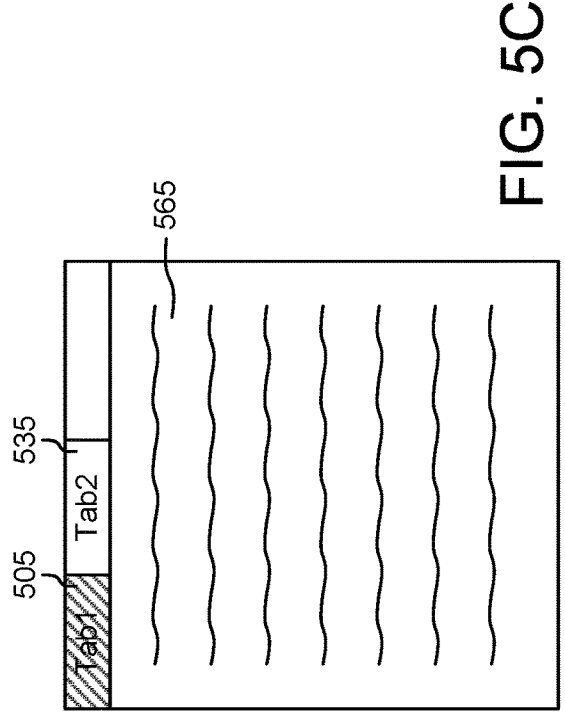
FIG. 5A
FIG. 5B
FIG. 5C

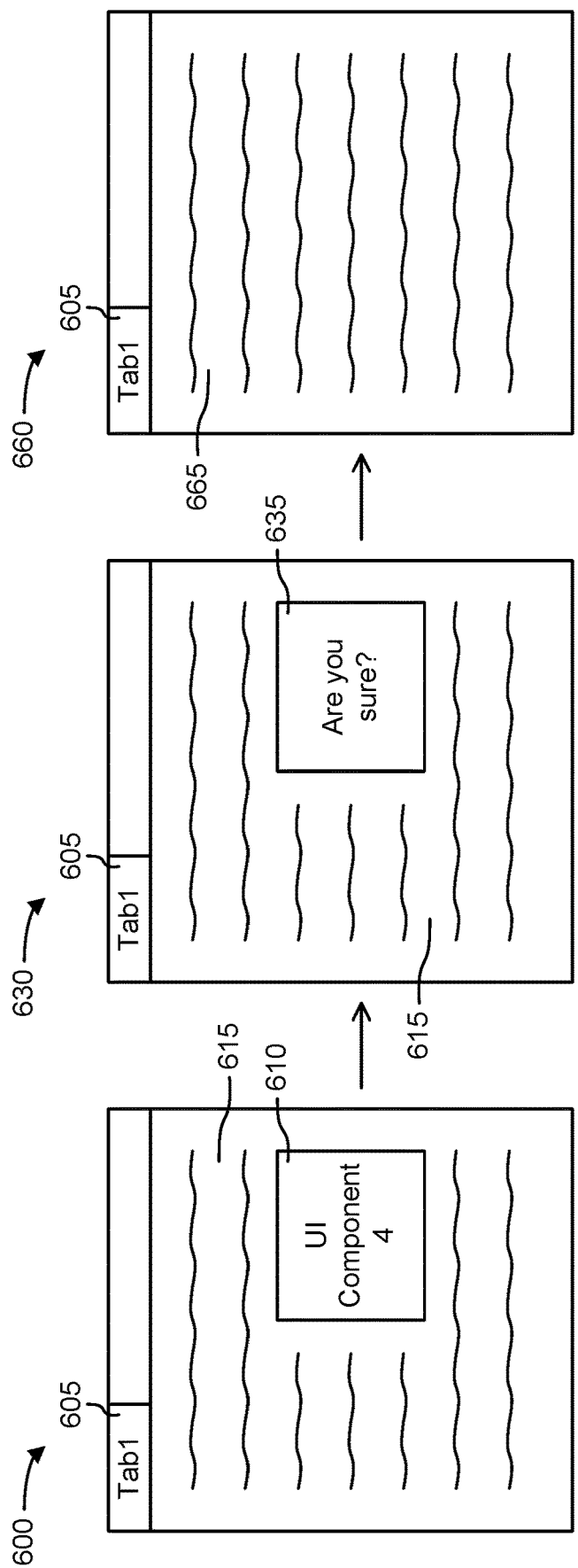

ADAPTIVE USER INTERFACE WITH REDUCED PAYLOAD

RELATED APPLICATIONS

The present application claims the benefit of and priority to P.C.T. Application No. PCT/US2016/060700, filed Nov. 4, 2016, entitled, "Adaptive User Interface with Reduced Payload," the entirety of which is incorporated by reference herein.

BACKGROUND

It is sometimes desirable to provide an enhanced interface to users that can provide an improved user experience. However, data items for implementing such an improved interface often utilize a larger payload, or amount of transmitted data, than other data items that do not include the enhanced features. When scaled over the transmission of a large number of data items to various devices over communication networks, the total increased payload can be substantial. Thus, indiscriminately transmitting the larger data items to all users reduces available bandwidth on the network and adversely impacts network efficiency. Additionally, the increased data transmitted to client devices on the network requires and uses computing resources (e.g., memory resources) on the client devices.

SUMMARY

Some illustrative implementations of the disclosure relate to a method that includes identifying, by one or more processors, a plurality of data files available for transmission to a client device, each of the plurality of data files transmitted as a set of data packets having a payload comprising an amount of data, each of the plurality of data files having different payloads and causing the client device to display a respective user interface component within a user interface on the client device. The method further includes determining, by the one or more processors, a property of at least one of the client device or a user associated with the client device and selecting, by the one or more processors, a data file from among the plurality of data files in response to the property. Selecting the data file includes selecting a first data file having a first payload in response to the property having a first characteristic and selecting a second data file having a second payload greater than the first payload in response to the property having a second characteristic. The method further includes causing the selected data file to be transmitted to the client device.

In some implementations of the method, the property indicates a likelihood of the user unintentionally selecting a user-selectable portion of the user interface, and the step of selecting the data file includes selecting the first data file having the first payload in response to the property indicating the likelihood of the user unintentionally selecting the user-selectable portion of the user interface is less than or equal to a threshold and selecting the second data file having the second payload greater than the first payload in response to the property indicating the likelihood of the user unintentionally selecting the user-selectable portion of the user interface is greater than the threshold.

In some implementations, the first data file is configured to cause the client device to display, within a first interface of an application, a first user interface component having a first user-selectable portion that, upon selection, causes the first interface of the application to navigate from a first page to a second page, and the second data file is configured to cause the client device to display, within the first interface of the application, a second user interface component having a second user-selectable portion that, upon selection, causes the application to open the second page within a different interface than the first interface. In some such implementations, the application comprises a browser application and the first interface comprises an active browser tab, and the second user-selectable portion causes the browser application to open the second page within a different browser tab than the active browser tab. In some such implementations, the application comprises a browser application and the first interface comprises an active browser window, and the second user-selectable portion causes the browser application to open the new page within a different browser window than the active browser window. In some such implementations, the second user-selectable portion, upon selection, further causes the application to replace the second user interface component with a third user interface component within the first interface. For example, the third user interface component may include a third user-selectable portion that allows the user to share at least one of the second user interface component or content relating to the second user interface component with another user via at least one of a messaging service or a social media service.

In some implementations of the method, the first data file is configured to cause the client device to display, within an application, a first user interface component having a first user-selectable portion that, upon selection, causes an active interface of the application to navigate from a current page to a new page, and the second data file is configured to cause the client device to display, within the application, a second user interface component having a second user-selectable portion that, upon selection, activates an interface component configured to confirm that the user intends to navigate away from the current page before navigating from the current page to the new page.

In some implementations, the step of selecting the data file includes selecting the data file in response to both the property and the payloads of the data files.

In some implementations, the property indicates a likelihood of the user selecting a user-selectable portion of the user interface.

Some implementations relate to a system including at least one computing device operably coupled to at least one memory. The at least one computing device is configured to identify a plurality of data files available for transmission to a client device, each of the plurality of data files transmitted as a set of data packets having a payload comprising an amount of data, each of the plurality of data files having different payloads and causing the client device to display a respective user interface component within a user interface on the client device. The at least one computing device is further configured to determine a property of at least one of the client device or a user associated with the client device and select a data file from among the plurality of data files in response to the property. The at least one computing device is configured to select a first data file having a first payload in response to the property having a first characteristic and select a second data file having a second payload greater than the first payload in response to the property having a second characteristic. The at least one computing device is further configured to cause the selected data file to be transmitted to the client device.

In some implementations of the system, the property indicates a likelihood of the user unintentionally selecting a user-selectable portion of the user interface, and the at least one computing device is configured to select the first data file having the first payload in response to the property indicating the likelihood of the user unintentionally selecting the user-selectable portion of the user interface is less than or equal to a threshold and select the second data file having the second payload greater than the first payload in response to the property indicating the likelihood of the user unintentionally selecting the user-selectable portion of the user interface is greater than the threshold.

In some implementations, the first data file is configured to cause the client device to display, within a first interface of an application, a first user interface component having a first user-selectable portion that, upon selection, causes the first interface of the application to navigate from a first page to a second page, and the second data file is configured to cause the client device to display, within the first interface of the application, a second user interface component having a second user-selectable portion that, upon selection, causes the application to open the second page within a different interface than the first interface. In some such implementations, the application comprises a browser application and the first interface comprises an active browser tab, and the second user-selectable portion causes the browser application to open the second page within a different browser tab than the active browser tab. In some such implementations, the application comprises a browser application and the first interface comprises an active browser window, and the second user-selectable portion causes the browser application to open the new page within a different browser window than the active browser window. In some such implementations, the second user-selectable portion, upon selection, further causes the application to replace the second user interface component with a third user interface component within the first interface. For example, the third user interface component may include a third user-selectable portion that allows the user to share at least one of the second user interface component or content relating to the second user interface component with another user via at least one of a messaging service or a social media service.

In some implementations, the at least one computing device is configured to select the data file in response to both the property and the payloads of the data files.

In some implementations, one or more computer-readable storage media may have instructions stored thereon that, when executed by at least one processor, cause the at least one processor to perform operations. In some such implementations, the instructions may cause the processor to implement any or all of the method and system-related features discussed above.

In some implementations, the operations include identifying a plurality of data files available for transmission to a client device, each of the plurality of data files transmitted as a set of data packets having a payload comprising an amount of data, each of the plurality of data files having different payloads and causing the client device to display a respective user interface component within a user interface on the client device. The operations further include determining a property of at least one of the client device or a user associated with the client device and selecting a data file from among the plurality of data files in response to the property and the payloads of the data files. Selecting the data file includes selecting a first data file in response to the property having a first characteristic and the first data file having a first payload. In some implementations, the first data file is configured to cause the client device to display, within an active browser tab of a browser application, a first user interface component having a first user-selectable portion that, upon selection, causes the active browser tab to navigate from a first page to a second page. Selecting the data file further includes selecting a second data file in response to the property having a second characteristic and the second data file having a second payload greater than the first payload and selecting a third data file in response to the property having a third characteristic and the third data file having a third payload greater than the second payload. In some implementations, at least one of the second data file or the third data file is configured to cause the client device to display, within the active browser tab of the browser application, a second user interface component having a second user-selectable portion that, upon selection, causes the browser application to open the second page within a different browser tab than the first browser tab. The operations further include causing the selected data file to be transmitted to the client device.

In some implementations, the property indicating a likelihood of the user unintentionally selecting a user-selectable portion of the user interface, and the operation of selecting the data file includes selecting the first data file having the first payload in response to the property indicating the likelihood of the user unintentionally selecting the user-selectable portion of the user interface is less than or equal to a threshold and selecting at least one of the second data file having the second payload or the third data file having the third payload in response to the property indicating the likelihood of the user unintentionally selecting the user-selectable portion of the user interface is greater than the threshold.

In some implementations, the second user-selectable portion, upon selection, further causes the application to replace the second user interface component with a third user interface component within the first interface, the third user interface component comprising a third user-selectable portion that allows the user to share at least one of the second user interface component or content relating to the second user interface component with another user via at least one of a messaging service or a social media service.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 4A is an illustration of an interface within which a first user interface component is displayed according to an illustrative implementation.

FIG. 4B is an illustration of the interface displayed upon selection of the first user interface component in the interface of FIG. 4A according to an illustrative implementation.

FIG. 5A is an illustration of an interface within which a second user interface component is displayed according to an illustrative implementation.

FIG. 5B is an illustration of the interface (e.g., including a third user interface component) displayed upon selection of the second user interface component in the interface of FIG. 5A according to an illustrative implementation.

FIG. 5C is an illustration of a second interface displayed upon selection of the second user interface component in the interface of FIG. 5A according to an illustrative implementation.

FIG. 6A is an illustration of an interface within which a fourth user interface component is displayed according to an illustrative implementation.

FIG. 6B is an illustration of the interface, including a modified fourth user interface component, displayed upon selection of the fourth user interface component in the interface of FIG. 6A according to an illustrative implementation.

FIG. 6C is an illustration of the interface displayed upon selection of the modified fourth user interface component in the interface of FIG. 6B according to an illustrative implementation.

DETAILED DESCRIPTION

Figure 1:
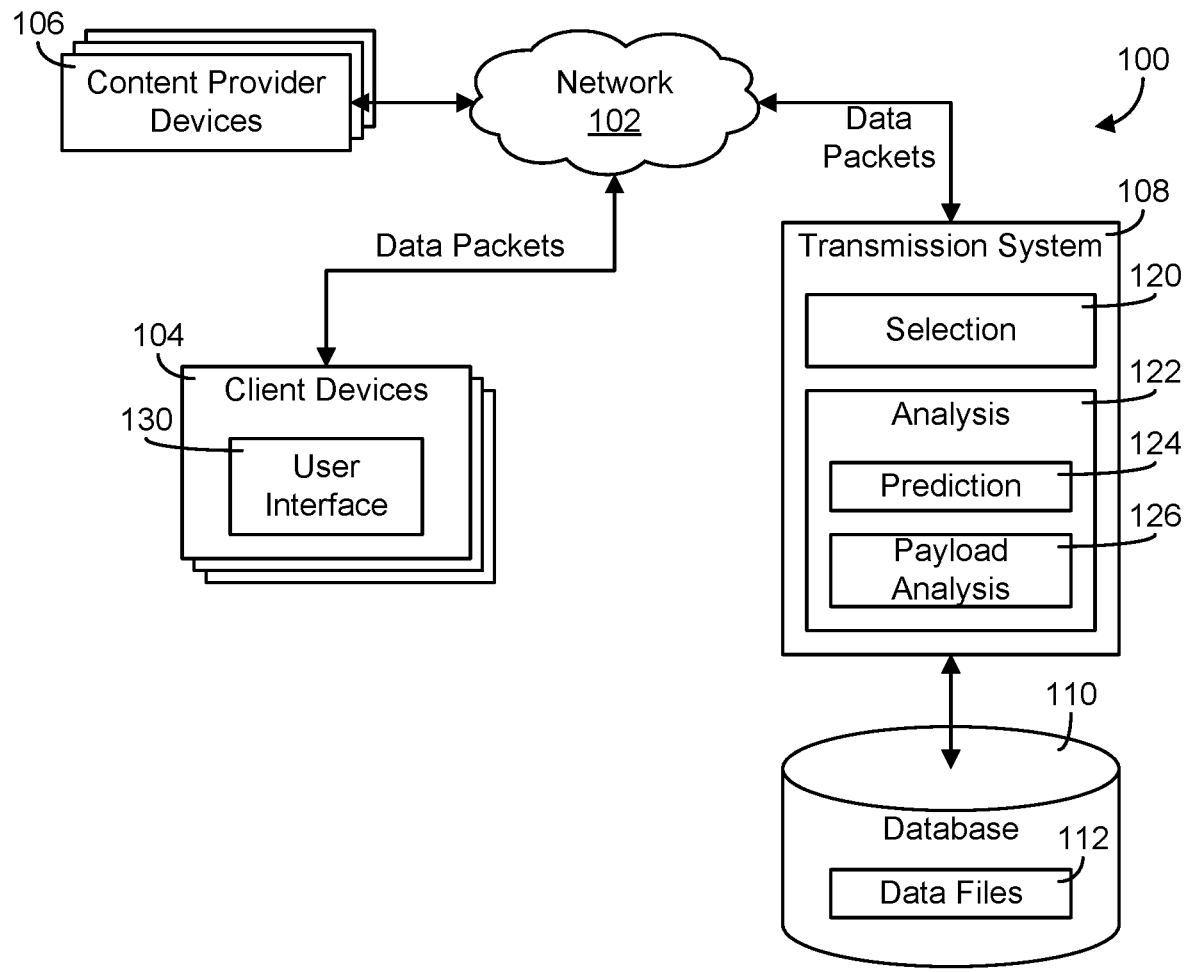
FIG. 1 is a block diagram of a transmission system and associated environment according to an illustrative implementation.

Referring generally to the Figures, various illustrative systems and methods are provided that may be used to provide an adaptive user interface (UI) that limits an amount of transmitted data to implement the interface when transmitting data packets over a communication network. Adaptive user interfaces include any type of interface provided to a user (e.g., via a client device of the user) in which one or more UI components can be modified to include different types of content. The different UI components may be used to provide an improved user experience. For example, some types of UI components may be designed to help prevent against accidental clicks of user-selectable portions of the content and/or provide an improved experience in the event an item is accidentally clicked (e.g., opening the landing page in a new interface).

Transmitting data items over a network to implement such an adaptive UI can substantially increase the amount of data used to implement the features and, accordingly, transmitted over the network. For example, data items for implementing an improved interface often utilize a larger payload, or amount of transmitted data, than other data items that do not include the enhanced features. When a large number of data items are sent to implement the improved interface on many devices, the total increased payload can be substantial. Thus, while the UI components may improve the user experience in some aspects, transmitting the larger data items to large groups of users reduces available bandwidth on the network and adversely impacts network efficiency. In some circumstances, the effect on the network may result in increased maintenance costs for the network or adversely impact the experience of users utilizing the network (e.g., due to increased latency when loading webpages or other interfaces). Additionally, the increased data transmitted to client devices on the network requires and uses additional computing resources (e.g., memory resources) on the client devices compared to another available payload.

According to various implementations, the systems and methods of the present disclosure provide for the provision of an adaptive UI over a communications network. A transmission system identifies a plurality of data files available for transmission to a client device. Each of the data files is configured to cause the client device to display a different UI component. Each of the data files is transmitted to client devices as a set of one or more data packets having a payload, or amount of transmitted data, and the payloads differ between the data files. For example, a first data file may cause the client device to display a basic UI component and may have a first payload. A second data file may cause the client device to display an enhanced UI having one or more different features than the basic interface, and the second data file may have a second payload that is larger than the first payload.

The transmission system selects a data file to transmit to the client device using a property of the client device and/or a user associated with the client device. In some implementations, the transmission system determines a likelihood of the user unintentionally selecting user-selectable components of the UI. For example, the transmission device may obtain data indicating a frequency with which the user takes actions indicating the user unintentionally selected a selectable item, such as how frequently the user selects a "back" button of a browser interface after selecting an item that causes the browser to navigate to a different webpage. If the amount/percentage of times the user selects the "back" button is above a threshold, this may indicate that the user tends to accidentally select items when the user wishes to remain on a current page instead of navigating to the new page. In some implementations, the likelihood may be based upon a property of the device, for example a device identifier that identifies a property of the device that is indicative of an increased likelihood of the user unintentionally selecting user-selectable components of the user interface. The property of the device may, for example, indicate an input type associated with the device. In this way, determination of a likelihood of the user unintentionally selecting user-selectable content may be determined without analysis of existing information associated with the user's device interaction.

In some such implementations, the transmission system selects a data file to transmit to the client device based on the likelihood of the user unintentionally selecting the user-selectable components of the UI. For example, the transmission system may select a first data item configured to implement a first UI component in response to determining the likelihood of the user unintentionally selecting user-selectable components is below a threshold level. In some implementations, the first UI component may include a user-selectable portion that causes an interface of the client device (e.g., a current tab or window of a browser application) to navigate from a current page to a new page in response to selection by the user. The transmission system may select a second data item configured to implement a second UI component in response to determining the likelihood of the user unintentionally selecting user-selectable components is above the threshold level. The second data item may have a higher transmission payload than the first data item, and the second UI component may include features designed to improve the user experience for users who tend to mistakenly select items in a UI. For example, in some implementations, the second UI component includes a user-selectable portion that, when selected, causes the interface of the client device to open a new interface (e.g., a new browser tab or window) in which a new landing page is displayed and retain the current page within the current interface (e.g., the current tab/window). In some implementations, the user-selectable portion of the second interface component may additionally or alternatively provide a verification component upon selection, such as an interface that asks the user to verify that he/she intended to select the item and navigate to a new page. Thus, in some implementations, the higher-payload second data item is transmitted to client devices where the user is expected to benefit from the UI enhancements.

In some implementations, the transmission system may select a data file to transmit to the client device based on both the property of the client device/user and the payloads of the data files. For example, consider an example in which the available data items for transmission include a first, basic item with a 100 kB payload, a second item with a 300 kB payload, and a third item with a 2 MB payload. The transmission system may select the second item for transmission to a client device where the user is determined to have a moderate likelihood of unintentionally selecting user-selectable components of the UI. The transmission system may be configured to not select the third item because the additional 1.7 MB required to transmit the third item is not justified by the incremental user experience improvements between the second and third items.

The adaptive UI features of the present disclosure allow for the transmission system to provide UI enhancements to various users while reducing an amount of data transmitted across communications networks to implement user interfaces on client devices. The transmission system can transmit a data item with a higher payload when the UI component is expected to be beneficial (e.g., when the UI component is expected to enhance the user experience in a meaningful way), and can transmit a different data item with a lower payload when the benefit is expected to be lower (e.g., when the user experience is less likely to be meaningfully enhanced by the UI component associated with the higher payload). In this manner, the transmission system may balance the technical costs of provision of enhanced UI components to different users with the technical benefits associated with the enhanced UI components.

For situations in which the systems discussed herein collect and/or utilize personal information about users, or may make use of personal information, the users may be provided with an opportunity to control whether programs or features that may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

Referring now to FIG. 1, and in brief overview, a block diagram of a transmission system 108 and associated environment 100 is shown according to an illustrative implementation. One or more client devices 104 may be used by a user to perform various actions and/or access various types of content, some of which may be provided over a network 102 (e.g., the Internet, LAN, WAN, etc.). For example, client devices 104 may be used to access websites (e.g., using an internet browser), media files, and/or any other types of content. A transmission system 108 may be configured to select content for display to users within resources (e.g., webpages, applications, etc.) and to provide data files 112 from a database 110 to client devices 104 over network 102 for display within the resources. The data files from which transmission system 108 selects items to be transmitted may be provided by one or more content providers via network 102 using one or more content provider devices 106. The data files may be configured to cause the client devices 104 to display UI components within interfaces shown on a display of client devices 104 (e.g., within a page shown in a browser application, within an interface of an app shown on a mobile device, etc.).

Transmission system 108 transmits data files 112 to client devices 104 that cause client devices 104 to implement components of an adaptive UI. Transmission system 108 selects between multiple different data files 112 that cause client devices 104 to display different UI components. For example, the different UI components may have a different visual appearance from one another, different content, cause different actions to occur on the client device 104 upon selection of user-selectable portions of the component, etc. Each data file 112 may be transmitted as a set of data packets. A "set" of data packets, as referenced herein, includes one or more data packets unless otherwise indicated. The data packets for a data file 112 have a payload, or an amount of data transmitted from transmission system 108 to client devices 104 to send the data file 112. In some implementations, each data file 112 may have a different payload.

Transmission system 108 selects the data files 112 in response to one or more properties of a client device 104 or a user associated with the client device 104. Transmission system 108 may select one data file 112 in response to the property having a first characteristic and a different data file 112 having a different payload in response to the property having a second characteristic. For example, in some implementations, transmission system 108 determines a property indicating a likelihood of the user unintentionally selecting a user-selectable portion of a UI, such as a clickable portion of a content item displayed within the UI. Transmission system 108 may select a first data file that causes the client device 104 to display a first interface component in response to determining there is a low likelihood (e.g., at or below a threshold) of the user unintentionally selecting a user-selectable portion of an item in the interface. Transmission system 108 may select a second data file having a greater payload than the first data file in response to determining there is a high likelihood (e.g., above a threshold) of the user unintentionally selecting a user-selectable portion of an item in the interface. In some implementations, transmission system 108 may further consider the payload of the data files 112 in selecting which data file 112 to select for transmission to the client device 104.

Referring still to FIG. 1, and in greater detail, client devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more client devices 104 may be set-top boxes or other devices for use with a television set. In some implementations, content may be provided via a web-based application and/or an application resident on a client device 104. In some implementations, client devices 104 and/or content provider devices 106 may be designed to use various types of software and/or operating systems. In various illustrative implementations, client devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

Client devices 104 and/or content provider devices 106 may be configured to receive data from various sources using a network 102. In some implementations, network 102 may comprise a computing network (e.g., LAN, WAN, Internet, etc.) to which client devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Transmission system 108 is configured to transmit data files 112 to client devices 104 that cause client devices 104 to display UI components within an interface 130 on a display of the client devices 104. The UI components associated with data files 112 may include any type of content, including, but not limited to, text, images, or videos. In some implementations, the UI components may additionally or alternatively include non-visual content such as audio. Transmission system 108 selects data files 112 to transmit to client devices 104 as data packets having different payloads, or amounts of data. After receipt, client devices 104 use data files 112 to provide components of interface 130. Transmission system 108 may include one or more processors (e.g., any general purpose or special purpose processor), and may include and/or be operably coupled to one or more computer-readable storage media or memories (e.g., any computer-readable storage media, such as a magnetic storage, optical storage, flash storage, RAM, etc.). In various implementations, transmission system 108 may be implemented as a single system/server or may be distributed across multiple systems. For example, in some implementations, determination of a property of client devices 104 and/or users of the client devices 104 and/or assessment of the data files based on payload may be performed in one system/server (e.g., a transmission system), and actual selection and/or serving of the data files may be performed in a separate system/server (e.g., a content management system). It should be understood that, according to various implementation, various features of transmission system 108 discussed herein may be combined into a single system or distributed across multiple systems without departing from the scope of the present disclosure.

Transmission system 108 may include one or more circuits configured to perform various functions of transmission system 108. As discussed herein, the term "circuit" encompasses implementations including hardware, software, or a combination thereof. For example, in some implementations, the circuits may be implemented as specially configured hardware that carries out the described functionality. In some implementations, the circuits may be implemented using computer-readable instructions stored on a computer-readable storage medium, such as a volatile or non-volatile memory, that are executable by a processor or other type of circuitry to implement the described functions. In some implementations, the circuits may be implemented using a combination of hardware and computer-readable instructions. All such implementations are contemplated within the scope of the present disclosure.

Transmission system 108 may include a selection circuit 120 configured to identify data files 112 within database 110 available for transmission to client devices 104 and select data files to be transmitted to one or more of client devices 104 from among the data files 112. Each of data files 112 is transmitted as a set of one or more data packets, and the set of data packets for each data file 112 has a payload, or amount of data. The payloads differ between at least some of data files 112. For example, a first data file may have a first payload and cause client devices 104 to display a first UI component, such as a static block of text that does not change during viewing or based on user interactions on client devices 104. A second data file may have a second payload greater than the first payload and cause client devices 104 to display a second UI component, such as a component including an image, one or more user-selectable portions configured to cause actions to occur upon selection, one or more portions that change as a result of user interaction (e.g., visibly change in response to a user pressing or hovering a cursor over the UI component), etc. A third data file may have a third payload greater than the second payload and cause client devices 104 to display a third UI component, such as a video. It should be understood that the features of the present disclosure can be used to implement any type of UI components.

Transmission system 108 may include an analysis circuit 122 configured to determine and/or generate data to be used in selecting data files 112 to transmit to client devices 104. In some implementations, analysis circuit 122 includes a prediction circuit 124 configured to determine a property of client devices 104 and/or users of client devices 104 to be used in selecting data files 112. In some implementations, the property may indicate a likelihood of the user unintentionally selecting a user-selectable portion of a UI (e.g., a frequency with which the user selects a "back" button shortly after navigating to a new page). In some implementations, the property may indicate a likelihood of the user selecting a user-selectable portion of a UI such as interface 130 and/or a likelihood of the user making use of one or more enhanced features of UI components associated with data files 112 that may have larger payloads.

Analysis circuit 122 may additionally or alternatively include a payload analysis circuit 126. In some implementations, transmission system 108 may determine data files 112 to send to a particular client device in response to the property/properties of the client device/user, the payloads of data files 112, or both. Payload analysis circuit 126 may analyze the payloads of data files 112 and provide data relating to the payloads for use by selection circuit 120 in determining data files 112 to transmit to the client device. For example, payload analysis circuit 126 may determine, for each of several data files, whether the payloads of the data files are below or above one or more payload size thresholds. Selection circuit 120 may use the data generated by prediction circuit 124, payload analysis circuit 126, and/or other data generated by analysis circuit 122 to select one or more data files and cause the selected data files to be transmitted to the client device (e.g., either by directly transmitting the data files or causing another system, such as a content management system, to transmit the data files by transmitting data/commands to the other system).

While transmission system 108 has been shown in FIG. 1 to include different circuits, it should be understood that the particular construction shown in FIG. 1 is provided solely for the purposes of illustration, and other implementations may utilize different components. For example, the functions of multiple circuits may be combined into a single circuit and/or functions described as performed by a single circuit may be distributed amongst multiple circuits. All such modifications are contemplated within the scope of this disclosure.

Figure 2:
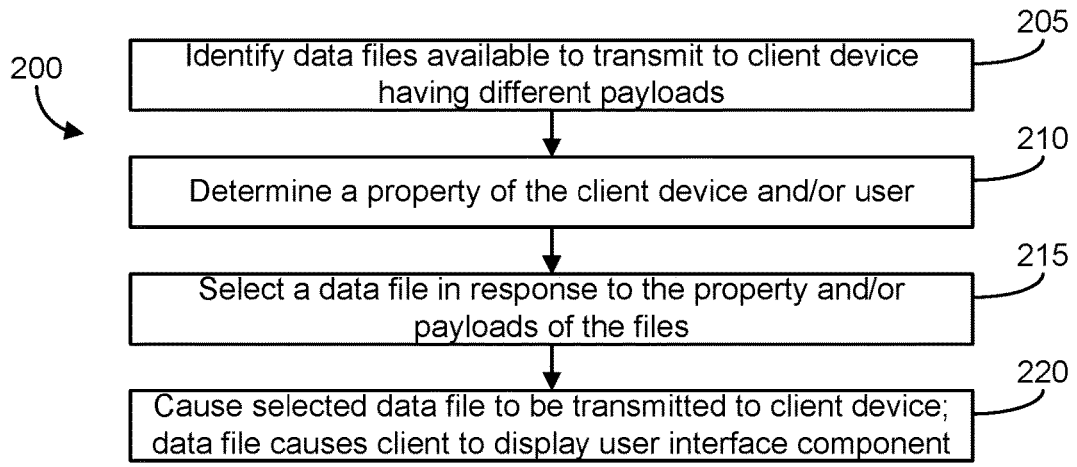
FIG. 2 is a flow diagram of a process for transmitting data files to implement user interface components on a client device according to an illustrative implementation.

FIG. 2 illustrates a flow diagram of a process 200 for transmitting data files to implement UI components on a client device according to an illustrative implementation. Referring to both FIGS. 1 and 2, transmission system 108 identifies data files 112 available to transmit to a client device 104 (205). Each data file 112 is transmitted to the client device 104 as a set of one or more data packets, and each set of data packets has a payload, or amount of data. For example, in some implementations, data files 112 may be transmitted over the Internet as Internet Protocol (IP) packets. In some implementations, data files 112 may each be transmitted as a single data packet. In some implementations, some or all data files 112 may be split up into multiple data packets for transmission to the client device 104 (e.g., data files 112 having a payload above a certain threshold may be split among multiple data packets). In some implementations, database 110 may store an indication of the payload of each of data files 112 along with data files 112, and transmission system 108 may determine the payload of available data files 112 by querying database 110. Each data file 112 is configured to cause the client device 104 to display a respective UI component within interface 130. In some implementations, there may be restrictions on which data files 112 can be sent to the client device 104; for example, particular data files 112 may have associated properties dictating that the data files 112 can only be transmitted to client devices 104 and/or users having certain properties or characteristics (e.g., a particular data file 112 may be restricted to serving only to mobile client devices and not to desktop computers).

Transmission system 108 may determine a property of the client device and/or user (210). In some implementations, the property may indicate a likelihood of the user unintentionally selecting a user-selectable portion of an interface such as interface 130. For example, the property may indicate a frequency with which the user selects a "back" button or other interface element configured to navigate to a previous page after selecting a link that navigates to a new page (e.g., expressed as an absolute value or a ratio of a number of times "back" is selected compared to a number of time "back" is not selected or a total number of instances of viewing/navigating between pages). In some implementations, the property may include a time component; for example, the property may indicate a frequency with which the user selects the "back" button within a threshold amount of time after navigating to the new page. In some implementations, the property may indicate a likelihood of the user selecting a user-selectable portion of an interface (e.g., a likelihood that, if presented with a UI component generated using a particular data file 112, the user would select a user-selectable portion of the UI component, such as clicking through an embedded link within the UI component). In some implementations, the property may indicate a likelihood that the user will make use of, or benefit from, particular features associated with certain data files 112. For example, the property may indicate a frequency with which the user watches videos presented within a UI (e.g., whether the user tends to click videos to activate them when presented within a UI component or typically does not click the videos). If a particular data file 112 causes the client device 104 to generate a UI component including an embedded video, that data file 112 may include a substantially greater payload than one not including an embedded video. In such an instance, in some implementations, transmission system 108 may select the data file 112 despite the large payload if the property indicates the user is likely to select the video or watch the video in its entirety, and may not select the data file 112 if the property indicates the user is unlikely to watch the video or is likely to watch only a small portion of the video. In some implementations, the property may indicate a likelihood of the user sharing a particular UI component or content related to a particular UI component. For example, the property may be based on the frequency with which the user selects "share" options on content, how active the user is on social media networks, how many messages the user transmits to other users via messaging services, etc.

Transmission system 108 may select a data file 112 from among the available data files 112 to transmit to the client device 104 in response to the property and/or the payloads of the data files (215). In some implementations, transmission system 108 selects the data file 112 in response to the property. In some implementations, transmission system 108 may select a first data file having a first payload in response to the property having a first characteristic and may select a second data file having a second payload (e.g., greater than the first payload) in response to the property having a second characteristic. For example, in some implementations, the property may represent a likelihood of the user selecting a user-selectable portion of a UI component with an interface. In such an example, according to some implementations, transmission system 108 selects a first data file having a lower payload (e.g., a smaller data file that causes the client device 104 to display a more basic UI component) in response to the property indicating the likelihood of the user selecting the user-selectable portion of the UI component is less than or equal to a threshold, and transmission system 108 selects a second data file having a higher payload than the first data file (e.g., a larger data file that causes the client device to display a UI component having one or more features not present in the UI component of the first data file, such as a UI component configured to open a landing page in a new interface and retain a current page within the current interface) in response to the property indicating the likelihood of the user selecting the user-selectable portion of the UI component is greater than the threshold.

In some implementations, transmission system 108 selects the data file 112 in response to the payloads associated with the data files. For example, in some implementations, transmission system 108 may determine that the available data files 112 to transmit to the client device 104 include three data files, and transmission system 108 may select the data file with the smallest payload for transmission. In various implementations, transmission system 108 may select the data file 112 using the payload alone or in combination with other factors.

In some implementations, transmission system 108 selects the data file 112 in response to both the property and the payloads associated with the data files 112. In some such implementations, transmission system 108 may select a first data file in response to the property having a first characteristic and the first data file having a first payload, select a second data file in response to the property having a second characteristic and the second data file having a second payload greater than the first payload, and select a third data file in response to the property having a third characteristic and the third data file having a third payload greater than the second payload. For example, in some implementations, if the property indicates the likelihood of the user selecting a user-selectable portion of a UI component is less than or equal to a first threshold, transmission system 108 may select a first data file with a first, smaller payload (e.g., a payload less than or equal to a first payload threshold). If the property indicates the likelihood of the user selecting a user-selectable portion of a UI component is greater than the first threshold but less than or equal to a second threshold, transmission system 108 may select a second data item with a second payload larger than the first payload (e.g., transmission system 108 may select a data item with a payload greater than the first payload threshold and less than or equal to a second payload threshold). If the property indicates the likelihood of the user selecting a user-selectable portion of a UI component is greater than the second threshold, transmission system 108 may select a third data item with a third payload larger than the second payload (e.g., transmission system 108 may select a data item with a payload greater than the second payload threshold). While this example is provided with respect to two payload thresholds and two property thresholds, any number of thresholds could be used in various implementations.

Transmission system 108 causes the selected data item 112 to be transmitted to the client device 104 (220). In some implementations, transmission system 108 itself transmits the selected data item 112 to the client device 104. In some implementations, transmission system 108 sends data (e.g., a command) to another system, such as a content management system configured to serve data files 112 to client devices 104, that is used by the other system to transmit the selected data item 112.

Figure 3:
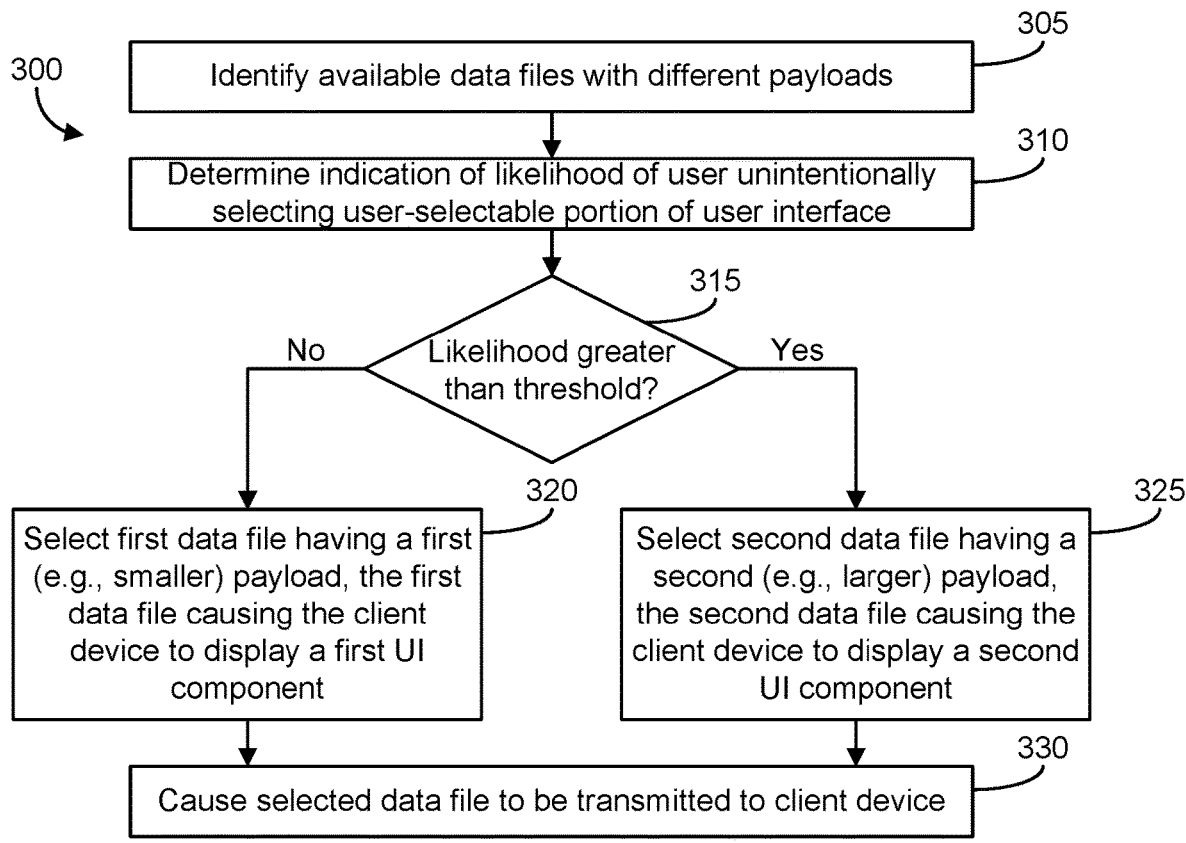
FIG. 3 is a flow diagram of a process for transmitting data files to implement user interface components on a client device in response to an indication of the likelihood of a user unintentionally selecting user-selectable portions of a user interface according to an illustrative implementation.

In some implementations, transmission system 108 may be configured to selectively provide an adaptive UI with UI components designed to improve the experience of users prone to particular types of behavior with respect to user interfaces, such as accidentally selecting selectable portions of the interface. FIG. 3 is a flow diagram of a process 300 for transmitting data files to implement UI components on a client device in response to an indication of the likelihood of a user unintentionally selecting user-selectable portions of a UI according to an illustrative implementation. Referring to FIGS. 1 and 3, transmission system 108 may identify available data files 112 to transmit to a particular client device 104 (305). The data files are configured to cause the client device 104 to display different respective UI components having different features. In the illustrated implementation, some of the UI components include features designed to improve the experience of users prone to unintentionally select user-selectable portions of user interfaces. For example, one data file may cause the client device 104 to display a UI component having a user-selectable portion that, upon selection, causes a landing page associated with the UI component to appear within a different interface than the active interface in which the UI component appears (e.g., a different browser tab or browser window of a browser application). In some such implementations, the original UI component in the active interface may be replaced with a new UI component. For example, the new UI component may provide a selectable portion (e.g., a button) allowing the user to share the original UI component or content related to the original UI component (e.g., a link to a particular landing page, such as the landing page of the original UI component) with other users (e.g., via a messaging service and/or social media service). In another example, a data file may cause the client device 104 to display a UI component having a user-selectable portion that, upon selection, activates an interface component within the active interface asking the user to confirm that the user intends to navigate away from the current page to a new page within the active interface before the client device 104 navigates to the new page. In implementations in which a UI component is replaced with another UI component, the application (e.g., browser application) may replace one UI component with another UI component, the original UI component may replace itself with a new UI component (e.g., by transmitting data to transmission system 108 or another system causing the system to return data packet(s) with the new UI component, which is used to replace the original UI component by either the original UI component or the application), or any other method may be used to replace one UI component with another.

Transmission system 108 determines a property indicating a likelihood of the user unintentionally selecting a user-selectable portion of a UI (310). The property may be determined using one or more of a variety of methods. In some implementations, the property may be determined based on input from the user; for example, the user may provide an indication of whether the user feels he or she tends to experience accidental click-throughs never, rarely, occasionally, frequently, etc. In some implementations, the property may additionally or alternatively be determined in an automated fashion. For example, the property may be determined using data representative of historical activity associated with the user and/or the client device 104. The historical activity data may include data indicating a frequency with which the user selects a "back" button or other interface element configured to navigate to a previous page after selecting a link that navigates to a new page (e.g., expressed as an absolute value or a ratio of a number of times "back" is selected compared to a number of time "back" is not selected or a total number of instances of viewing/navigating between pages). In some implementations, the property may include a time component; for example, the property may indicate a frequency with which the user selects the "back" button within a threshold amount of time after navigating to the new page.

Transmission system 108 may determine whether the property indicates that the likelihood of the user unintentionally selecting a user-selectable portion of a UI is greater than a threshold likelihood (315). For example, in some implementations, transmission system 108 may determine whether historical activity data indicates that the percentage of time the user selects a "back" button or otherwise navigates back to a prior page after selecting a user-selectable item and navigating to a new page is above a threshold percentage (e.g., greater than fifteen percent). If the likelihood is less than or equal to the threshold, transmission system 108 may select a first data file having a first (e.g., smaller) payload for transmission to the client device (320). The first data file causes the client device 104 to display a first UI component, such as a basic component that omits one or more features designed to improve the experience of users prone to unintentionally select items. For example, in some implementations, the first UI component may include a user-selectable portion that, upon selection, causes an application (e.g., browser application) to navigate from a current page to a new page within an active interface (e.g., active browser tab/window) of the application.

If the likelihood is greater than the threshold, transmission system 108 may select a second data file having a second payload for transmission to the client device (320). The second payload may be larger than the payload of the first data file. The second data file causes the client device 104 to display a second UI component, which may include one or more features designed to improve the experience of users prone to unintentionally select items. For example, in some implementations, the second UI component may include a user-selectable portion that, upon selection, causes the application (e.g., browser application) to open a landing page within a different interface (e.g., new browser tab/window) than a first interface (e.g., active browser tab/window) within which the UI component is presented. In such implementations, in the event the selection was a mistake, the first interface remains on the original page so the user does not need to hit a "back" button to continue viewing the original page. In some implementations, the user-selectable portion of the second UI component may, upon selection, cause the application to display a notification asking the user to confirm he or she wishes to navigate to the new page before proceeding to navigate away from the current page to the new page. Once the data file is selected, transmission system 108 causes the selected data file to be transmitted to the client device 104 (330).

In the various implementations discussed above, the data files may include any type of content and/or be configured to implement any of a variety of features. In some implementations, different data files having different payloads may relate to the same or different subject matter but include different types of content. For example, a first item may have a smallest payload and include only text, a second item may have a second smallest payload and include a low-resolution image, a third item may have a larger payload than the second item and include a high-resolution image, a fourth item may have a largest payload and include an embedded video, etc. In some implementations, different data files may additionally or alternatively differ in features implemented by the corresponding UI components, such as actions that occur upon user interaction with the components or selection of user-selectable portions of the components. For example, some data items may cause actions to occur within a current interface of an application (e.g., cause a current browser tab/window to navigate from a first page to a second page) while others may cause actions to occur in a different interface (e.g., cause a second page to open in a different browser window/tab than the current window/tab). In some implementations, some data items cause a landing page to appear in a different interface and add a UI component or replace the selected UI component with a new UI component. In some such implementations, the new UI component may include a user-selectable component allowing the user to share the previously displayed UI component or content related to the previously-displayed UI component (e.g., a link to a particular landing page, such as the landing page of the original UI component) with other users via a messaging service (e.g., text message, email, or other messaging service), social media service, and/or another type of service through which content can be shared. In some implementations, the new UI component may include a message thanking the user for selecting the previously-displayed UI component.

FIGS. 4A through 6C illustrate several interfaces (e.g., interfaces of a browser application) that may be provided according to the features discussed herein according to illustrative implementations. Referring now to FIG. 4A, an illustration of an interface 400 within which a first UI component 410 is displayed is provided according to an illustrative implementation. Interface 400 includes a first browser tab 405 in which a first page 415 is displayed. First UI component 410 is displayed within first page 415 or within a separate portion of first browser tab 405. Upon selection of a selectable portion of first UI component 410, first browser tab 405 may navigate from first page 415 to a second page 455, as illustrated in interface 450 of FIG. 4B. In order to return to first page 415, the user may select a "back" button of interface 450 (not shown).

Referring now to FIG. 5A, an illustration of an interface 500 within which a second UI component 510 is displayed is provided according to an illustrative implementation. Interface 500 includes a first browser tab 505 in which a first page 515 is displayed. Second UI component 510 is displayed within first page 515 or within a separate portion of first browser tab 505. Upon selection of a selectable portion of second UI component 510, the application opens a second page 565 within a second browser tab 535, as illustrated in interface 560 of FIG. 5C. The application retains first page 515 within first browser tab 505, as illustrated in interface 530 of FIG. 5B. In the implementation shown in FIG. 5B, the application further replaces second UI component 510 with a third UI component 540. In some implementations, third UI component 540 may include a user-selectable portion allowing the user to share second UI component 510 or content related to second UI component 510 (e.g., a link to a particular landing page, such as second page 565) with other users via a messaging service (e.g., text message, email, or other messaging service), social media service, and/or another type of service through which content can be shared. In some implementations, selecting the "sharing" portion of third UI component 540 may cause the application or another application to create a template message to share the item via the messaging or social media service (e.g., including a pre-populated subject or body of a message including the content to be shared, such as a link). In some implementations, third UI component 540 may include a message thanking the user for selecting second UI component 510. In some implementations, the payload of the data file transmitted to the client device to cause the client device to display second UI component 510 may be larger than the payload of the data file transmitted to the client device to cause the client device to display first UI component 410 (e.g., due to additional payload used to implement the different functionality of second UI component 510). In some implementations, the third UI component 540 may only be provided in the event the user viewed second page 565 within second browser tab 535 for at least a threshold amount of time (e.g., at least five seconds).

FIG. 6A is an illustration of an interface 600 within which a fourth UI component 610 is displayed according to an illustrative implementation. Interface 500 includes a first browser tab 605 in which a first page 615 is displayed. Fourth UI component 610 is displayed within first page 615 or within a separate portion of first browser tab 605. Upon selection of a selectable portion of fourth UI component 610, the application causes a message 635 to be displayed within first browser tab 605, as shown in interface 630 of FIG. 6B.

Message 635 may ask the user to confirm that he or she intended to select a user-selectable portion of fourth UI component 610 and/or intended to navigate from first page 615 to a new page. Message 635 may include at least one selectable portion, such as a first portion through which the user can indicate that the user wishes to proceed to the new page and a second portion through which the user can indicate that the user wishes to remain on first page 615. In response to the user indicating he or she wishes to proceed to the new page, the application may display a second page 665 within first browser tab 605 or a different browser tab, as shown in interface 660 of FIG. 6C. In some implementations, the payload of the data file transmitted to the client device to cause the client device to display fourth UI component 610 may be larger than the payload of the data file transmitted to the client device to cause the client device to display first UI component 410 (e.g., due to additional payload used to implement the different functionality of fourth UI component 610).

Various implementations discussed above, including those discussed with respect to FIGS. 1-3, utilize one or more properties associated with a user and/or client device in determining data files to serve to client devices. The data used to determine the properties may be obtained in a variety of different ways. For example, in various implementations, the data may be obtained using browser cookies or pixels, an identifier associated with an authenticated or signed-in user profile, an identifier associated with the client device, etc. In some implementations, the data may be obtained by receiving data associated with a particular device fingerprint (e.g., identifying a same device across multiple data items using a combination of characteristics of the device, such as cellular frequency, location, battery charge status, etc.). In some implementations, the data may be obtained by identifying data associated with groups of users. Any method of obtaining data used to determine properties of a user and/or client device may be utilized in various implementations of the present disclosure.

Various types of properties may be used alone or in combination in the implementations discussed above, including those discussed with respect to FIGS. 1-3, to select data items to send to client devices. In some implementations, the likelihood of a user to select a user-selectable portion of a UI component may be determined based at least in part on previous interactions of the user or previous interactions on the client device with the UI component or similar UI components (e.g., UI components having similar subject matter to the UI component being analyzed, such as if both UI components included content relating to football). For example, if the user has previously clicked through the same UI components or frequently clicked through similar UI components in the past, the user may be determined to be likely to select the user-selectable portion of the UI component. In some implementations, the property representative of the likelihood of a user to select a user-selectable portion of a UI component may be a click-through rate, conversion rate, etc. In some implementations, the likelihood of a user to select a user-selectable portion of a UI component may be determined based at least in part on a profile indicating likely interests of the user, such as based on sites the user has previously visited or interests the user has previously expressed. In some implementations, the transmission system may determine data items to present based on a balance between the potential benefit of presenting a particular UI component to a user as compared to the potential costs of doing so. For example, a UI component that opens a landing page in a new interface and provides a new UI component with a sharing option in the current interface may provide the benefit of the component being shared with other users, but the potential cost of a reduced rate of interaction with the landing page due to opening of the landing page in the new interface. In some implementations, metrics indicative of the benefits/costs (e.g., anticipated increase in users exposed to items, anticipated reduction in revenue relating to interaction with landing page, etc.) may be a part of the property/properties considered by the transmission system in determining data items to transmit to the client device.

Figure 7:
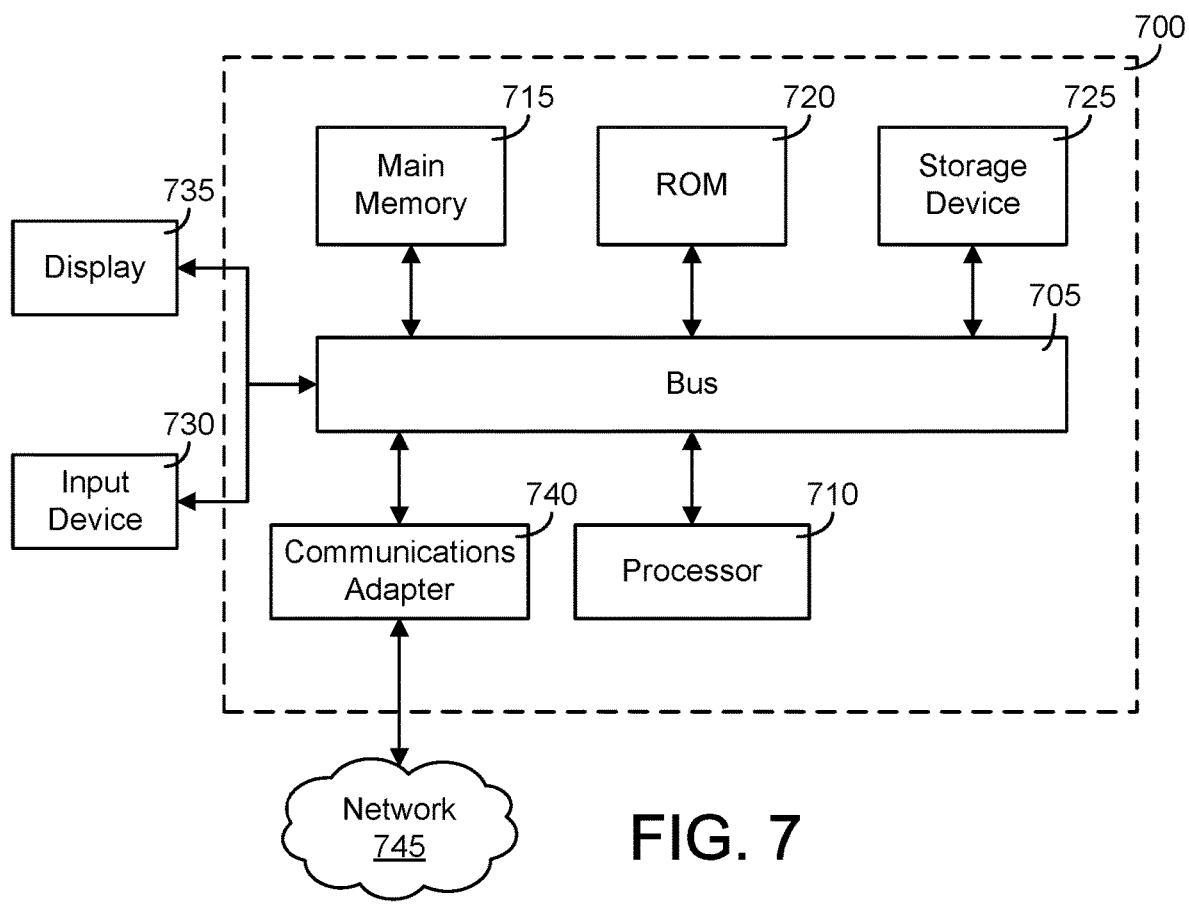
FIG. 7 is a block diagram of a computing system according to an illustrative implementation.

FIG. 7 illustrates a depiction of a computer system 700 that can be used, for example, to implement an illustrative client device 104, an illustrative transmission system 108, an illustrative content provider device 106, and/or various other illustrative systems described in the present disclosure. The computing system 700 includes a bus 705 or other communication component for communicating information and a processor 710 coupled to the bus 705 for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 710 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another implementation, the input device 730 has a touch screen display 735. The input device 730 can include a cursor control, such as a mouse, a trackball, or cursor direction keys, for communicating direction information and command selections to the processor 710 and for controlling cursor movement on the display 735.

In some implementations, the computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example, semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a backend component, e.g., as a data server, or that includes a middleware component, e.g., an application server, or that includes a frontend component, e.g., a client computer having a graphical UI or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of transmitting data packets over a network to provide an adaptive user interface, the method comprising:
   identifying, by one or more processors, a plurality of data files available for transmission to a client device, each of the plurality of data files transmitted as a set of data packets having a payload comprising an amount of data, each of the plurality of data files having different payloads and causing the client device to display a respective user interface component within a user interface on the client device;
   determining, by the one or more processors, a property of at least one of the client device or a user associated with the client device, the property indicating a likelihood of the user unintentionally selecting a user-selectable portion of the user interface;
   selecting, by the one or more processors, a data file from among the plurality of data files in response to the property, selecting the data file comprising:
      selecting a first data file having a first payload in response to the property indicating the likelihood of the user unintentionally selecting the user-selectable portion of the user interface is less than or equal to a threshold; and selecting a second data file having a second payload greater than the first payload in response to the property indicating the likelihood of the user unintentionally selecting the user-selectable portion of the user interface is greater than the threshold; and
causing the selected first or second data file to be transmitted to the client device.

2. The method of claim 1, the first data file configured to cause the client device to display, within a first interface of an application, a first user interface component having a first user-selectable portion that, upon selection, causes the first interface of the application to navigate from a first page to a second page, the second data file configured to cause the client device to display, within the first interface of the application, a second user interface component having a second user-selectable portion that, upon selection, causes the application to open the second page within a different interface than the first interface.

3. The method of claim 2, wherein the application comprises a browser application and the first interface comprises an active browser tab, and wherein the second user-selectable portion causes the browser application to open the second page within a different browser tab than the active browser tab.

4. The method of claim 2, wherein the application comprises a browser application and the first interface comprises an active browser window, and wherein the second user-selectable portion causes the browser application to open the new page within a different browser window than the active browser window.

5. The method of claim 2, wherein the second user-selectable portion, upon selection, further causes the application to replace the second user interface component with a third user interface component within the first interface.

6. The method of claim 5, wherein the third user interface component comprises a third user-selectable portion that allows the user to share at least one of the second user interface component or content relating to the second user interface component with another user via at least one of a messaging service or a social media service.

7. The method of claim 6, wherein the third user interface component comprises a messaging thanking the user for selecting the second user-selectable portion of the second user interface component.

8. The method of claim 1, the first data file configured to cause the client device to display, within an application, a first user interface component having a first user-selectable portion that, upon selection, causes an active interface of the application to navigate from a current page to a new page, the second data file configured to cause the client device to display, within the application, a second user interface component having a second user-selectable portion that, upon selection, activates an interface component configured to confirm that the user intends to navigate away from the current page before navigating from the current page to the new page.

9. The method of claim 1, the step of selecting the data file comprising selecting the data file in response to both the property and the payloads of the data files.

10. The method of claim 1, the property indicating a likelihood of the user selecting a user-selectable portion of the user interface.

11. A system comprising:
at least one computing device operably coupled to at least one memory and configured to:
identify a plurality of data files available for transmission to a client device, each of the plurality of data files transmitted as a set of data packets having a payload comprising an amount of data, each of the plurality of data files having different payloads and causing the client device to display a respective user interface component within a user interface on the client device;
determine a property of at least one of the client device or a user associated with the client device, the property indicating a likelihood of the user unintentionally selecting a user-selectable portion of the user interface;
select a data file from among the plurality of data files in response to the property, the at least one computing device configured to:
select a first data file having a first payload in response to the property indicating the likelihood of the user unintentionally selecting the user-selectable portion of the user interface is less than or equal to a threshold; and
select a second data file having a second payload greater than the first payload in response to the property indicating the likelihood of the user unintentionally selecting the user-selectable portion of the user interface is greater than the threshold; and
cause the selected first or second data file to be transmitted to the client device.

12. The system of claim 11, the first data file configured to cause the client device to display, within a first interface of an application, a first user interface component having a first user-selectable portion that, upon selection, causes the first interface of the application to navigate from a first page to a second page, the second data file configured to cause the client device to display, within the first interface of the application, a second user interface component having a second user-selectable portion that, upon selection, causes the application to open the second page within a different interface than the first interface.

13. The system of claim 12, wherein the application comprises a browser application and the first interface comprises an active browser tab, and wherein the second user-selectable portion causes the browser application to open the second page within a different browser tab than the active browser tab.

14. The system of claim 12, wherein the second user-selectable portion, upon selection, further causes the application to replace the second user interface component with a third user interface component within the first interface.

15. The system of claim 14, wherein the third user interface component comprises a third user-selectable portion that allows the user to share at least one of the second user interface component or content relating to the second user interface component with another user via at least one of a messaging service or a social media service.

16. The system of claim 11, the at least one computing device configured to select the data file in response to both the property and the payloads of the data files.

17. One or more computer-readable storage media having instructions stored thereon that, when executed by at least one processor, cause the at least one processor to perform operations comprising:
identifying a plurality of data files available for transmission to a client device, each of the plurality of data files transmitted as a set of data packets having a payload comprising an amount of data, each of the plurality of data files having different payloads and causing the client device to display a respective user interface component within a user interface on the client device;
determining a property of at least one of the client device or a user associated with the client device, the property indicating a likelihood of the user unintentionally selecting a user-selectable portion of the user interface;

selecting a data file from among the plurality of data files in response to the property and the payloads of the data files, selecting the data file comprising:

- selecting a first data file in response to the property indicating the likelihood of the user unintentionally selecting the user-selectable portion of the user interface is less than or equal to a threshold and the first data file having a first payload, the first data file configured to cause the client device to display, within an active browser tab of a browser application, a first user interface component having a first user-selectable portion that, upon selection, causes the active browser tab to navigate from a first page to a second page;
- selecting a second data file in response to the property indicating the likelihood of the user unintentionally selecting the user-selectable portion of the user interface is greater than the threshold and the second data file having a second payload greater than the first payload; or
- selecting a third data file in response to the property having a third characteristic and the third data file having a third payload greater than the second payload, at least one of the second data file or the third data file configured to cause the client device to display, within the active browser tab of the browser application, a second user interface component having a second user-selectable portion that, upon selection, causes the browser application to open the second page within a different browser tab than the first browser tab; and causing the selected first, second, or third data file to be transmitted to the client device.

18. The one or more computer-readable storage media of claim 17, wherein the second user-selectable portion, upon selection, further causes the application to replace the second user interface component with a third user interface component within the first interface, the third user interface component comprising a third user-selectable portion that allows the user to share at least one of the second user interface component or content relating to the second user interface component with another user via at least one of a messaging service or a social media service.

* * * * *